(12) United States Patent
Hsu

(10) Patent No.: US 7,815,318 B2
(45) Date of Patent: Oct. 19, 2010

(54) PROJECTOR CAPABLE OF ADJUSTING BRIGHTNESS AND BRIGHTNESS UNIFORMITY

(75) Inventor: Chien-Chiang Hsu, Taoyuan (TW)

(73) Assignee: Qlada Corporation, Taoyuan County (TW)

( * ) Notice: Subject to any disclaimer, the term of this patent is extended or adjusted under 35 U.S.C. 154(b) by 906 days.

(21) Appl. No.: 11/657,526

(22) Filed: Jan. 25, 2007

(65) Prior Publication Data

US 2007/0171385 A1 Jul. 26, 2007

(30) Foreign Application Priority Data

Jan. 25, 2006 (TW) .............................. 95102918 A

(51) Int. Cl.
*G03B 21/14* (2006.01)
*G03B 3/00* (2006.01)
*G02B 6/00* (2006.01)
*G03H 1/00* (2006.01)
*H04N 5/74* (2006.01)

(52) U.S. Cl. ..................... 353/101; 385/133; 359/34; 348/771

(58) Field of Classification Search ......... 353/100–101; 385/133, 146; 359/34; 348/771
See application file for complete search history.

(56) References Cited

U.S. PATENT DOCUMENTS

| 5,860,721 | A * | 1/1999 | Bowron et al. ............... 353/101 |
| 6,113,240 | A * | 9/2000 | Iizuka .......................... 353/31 |
| 6,461,001 | B2 * | 10/2002 | Okamori et al. ............. 353/102 |
| 7,354,160 | B2 * | 4/2008 | Lin .............................. 353/87 |
| 7,465,054 | B2 * | 12/2008 | Howard et al. ............... 353/122 |
| 2006/0279713 | A1 * | 12/2006 | Wang et al. .................. 353/101 |

* cited by examiner

*Primary Examiner*—Georgia Y Epps
*Assistant Examiner*—Magda Cruz

(57) ABSTRACT

A projector capable of adjusting brightness and brightness uniformity includes a light module, a light pipe, a first lens module, a second lens module and an image module. The light module generates a light ray. The light pipe includes an entrance and an exit. The light ray is converged onto the entrance of the light pipe and outputted through the exit of the light pipe. The first lens module has a first focal surface, which overlaps the exit of the light pipe, and receives the light ray outputted through the exit of the light pipe. The second lens module has a second focal surface and receives the light ray outputted through the first lens module. The image module is disposed on the second focal surface of the second lens module and receives the light ray outputted through the second lens module.

13 Claims, 6 Drawing Sheets

PROJECTOR CAPABLE OF ADJUSTING BRIGHTNESS AND BRIGHTNESS UNIFORMITY

This application claims the benefit of Taiwan application Serial No. 95102918, filed Jan. 25, 2006, the subject matter of which is incorporated herein by reference.

BACKGROUND OF THE INVENTION

1. Field of the Invention

The invention relates in general to a projector, and more particularly to a projector capable of adjusting brightness and brightness uniformity.

2. Description of the Related Art

Whether an optical path in a projector is well designed may influence the image representation of the projector, which is finally projected onto a screen. Thus, how to enhance the imaging brightness and uniformity of the projector effectively has become the focus, which is getting more and more concerned in the projector market.

FIG. 1 (Prior Art) is a schematic illustration showing a conventional projector 10. Referring to FIG. 1, the conventional projector 10 includes a light module 110, a light pipe 120, a first lens module 130, a second lens module 140, an image module 150 and a lens 160. The light module 110 includes a light bulb 112 and a bulb shade 114 for reflecting and converging the light ray L generated by the light bulb 112. The light pipe 120 includes an entrance 122 and an exit 124. The light ray L is converted into a light converging spot P on the entrance 122 and then homogenized by the light pipe 120 and outputted through the exit 124. The light ray L outputted through the exit 124 passes through the first lens module 130 and the second lens module 140, and is then inputted to the image module 150. The light ray L reflected by the image module 150 generates different brightness values and is then projected onto a screen 170 through the lens 160.

In order to make the image representation of the conventional projector 10 reach the predetermined target, the position of the light module 110 relative to that of the light pipe 120 is considered when the conventional projector 10 is being designed. Thus, it is possible to control the light converging spot P to fall on the optical axis A of the light pipe 120, and the better imaging brightness and uniformity may be obtained.

However, when the light module 110 is being manufactured, each component is not properly and precisely assembled. For example, the deviation in assembling the light bulb 112 and the bulb shade 114 together tends to shift the position of the light bulb 112 and thus the position of the light converging spot P. When the light converging spot P is shifted from the optical axis A of the light pipe 120, the imaging brightness and uniformity of the conventional projector 10 deteriorate.

SUMMARY OF THE INVENTION

The invention is directed to a projector capable of adjusting the imaging brightness and brightness uniformity. An exit of a light pipe is aligned with a focal surface of a first lens module, and an image module is also disposed on a focal surface of a second lens module. When the light converging spot is shifted, the light pipe and the first lens module are simultaneously moved in a common-optical-axis manner such that the light converging spot falls on the optical axis of the light pipe and the predetermined imaging brightness and uniformity may be obtained.

According to the present invention, a projector capable of adjusting brightness and uniformity is provided. The projector includes a light module, a light pipe, a first lens module, a second lens module and an image module. The light module generates a light ray. The light pipe has an entrance and an exit. The light ray is converged onto the entrance of the light pipe and outputted through the exit of the light pipe. The first lens module has a first focal surface overlapping the exit of the light pipe. The first lens module receives the light ray outputted through the exit of the light pipe. The second lens module has a second focal surface and receives the light ray outputted through the first lens module. The image module is disposed on the second focal surface of the second lens module and receives the light ray outputted through the second lens module.

The invention will become apparent from the following detailed description of the preferred but non-limiting embodiment. The following description is made with reference to the accompanying drawings.

DETAILED DESCRIPTION OF THE INVENTION

If a light bulb deviates from a predetermined position when a light module is being manufactured, the imaging brightness and uniformity of a projector deteriorate therewith. The projector may have the better image representation if some optical components can be controlled and adjusted to achieve the predetermined imaging brightness and uniformity without influencing the illumination region of an image module to which a light ray is incident.

Figure 1:
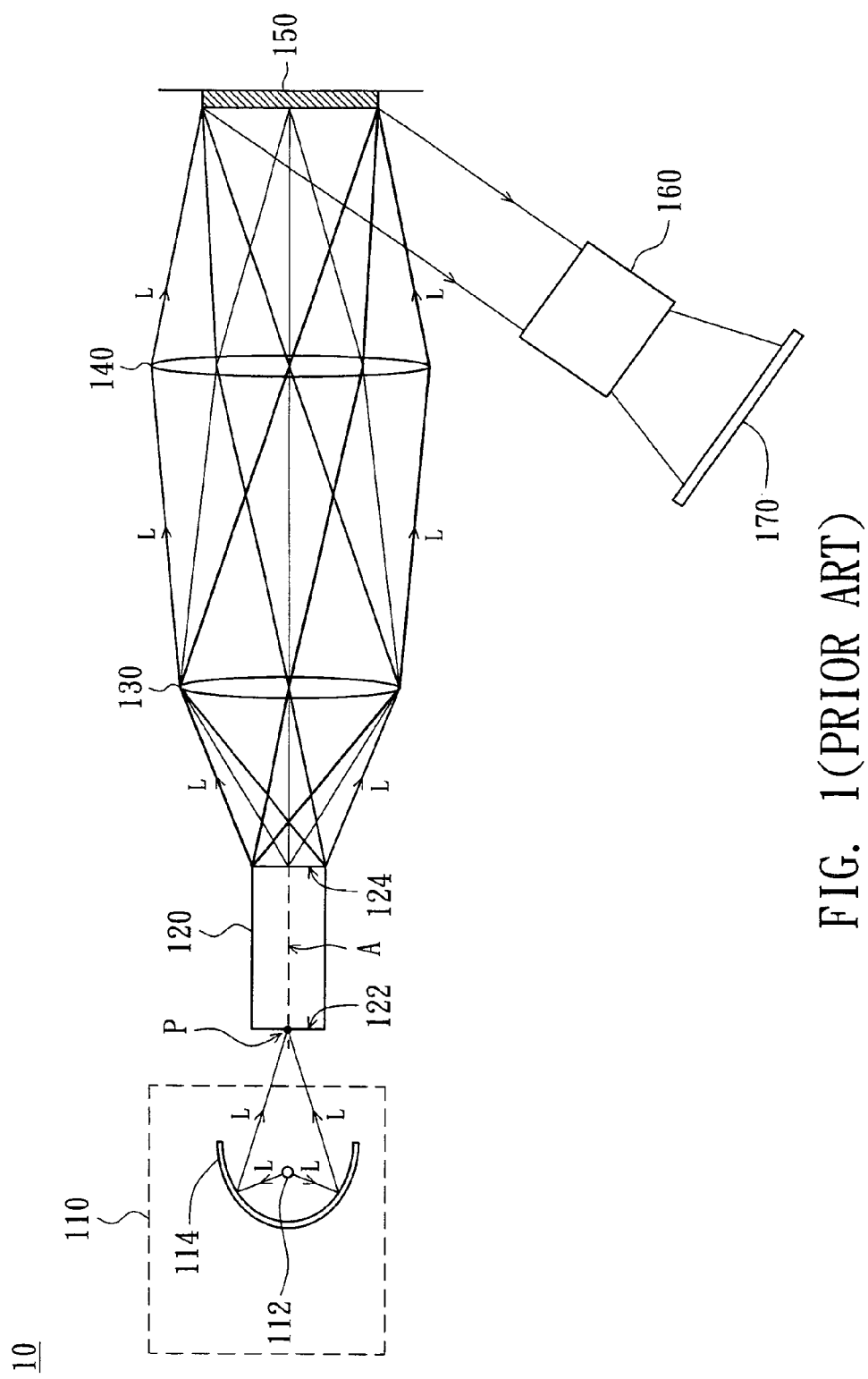
FIG. 1 (Prior Art) is a schematic illustration showing a conventional projector.
Figure 2:
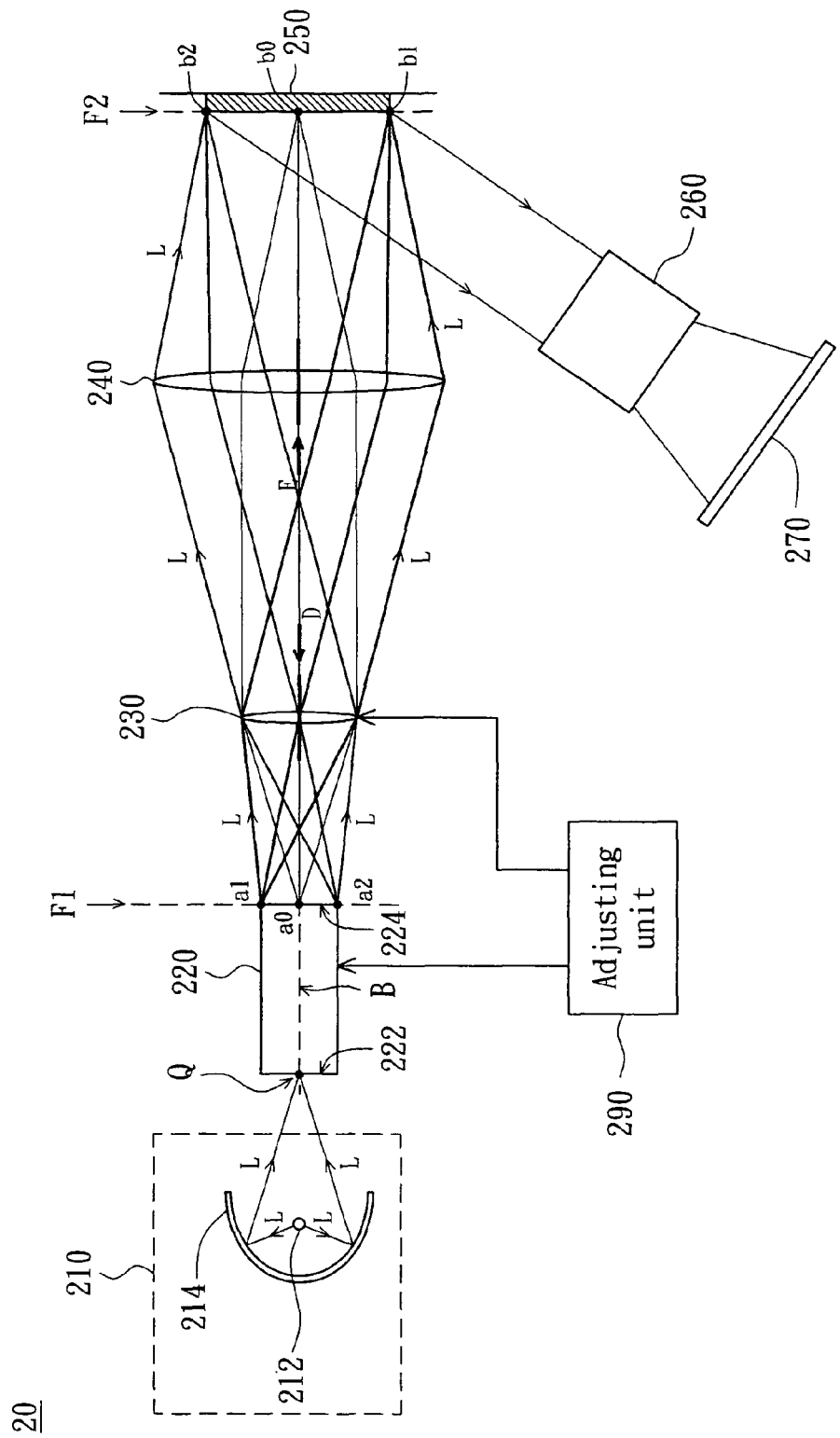
FIG. 2 is a schematic illustration showing a projector according to a preferred embodiment of the invention.

FIG. 2 is a schematic illustration showing a projector 20 according to a preferred embodiment of the invention. Referring to FIG. 2, the projector 20 includes a light module 210, a light pipe 220, a first lens module 230, a second lens module 240, an image module 250, a lens 260 and an adjusting unit 290. The light module 210 includes a light bulb 212 and a bulb shade 214, and the light pipe 220 has an entrance 222 and an exit 224. The light bulb 212 generates a light ray L, and the bulb shade 214 converges the light ray L into a light converging spot Q falling on the entrance 222 and an optical axis B of the light pipe 220. An optical axis D of the first lens module 230 overlaps the optical axis B of the light pipe 220. The first lens module 230 has a first focal surface F1 overlapping the exit 224. The second lens module 240 has a second focal surface F2, and the image module 250 is disposed on the second focal surface F2 and an optical axis E of the second lens module 240. The image module 250 may be, for example, a digital micro-mirror device (DMD). The adjusting unit 290 adjusts positions of the light pipe 220 and the first lens module 230 in horizontal and vertical directions.

The light ray L is converged onto the entrance 222 and is homogenized by the light pipe 220. The light ray L is outputted through the exit 224 and inputted into the first lens module 230. Because the surface of the exit 224 overlaps the first focal surface F1 and the optical axis B of the light pipe 220 overlaps the optical axis D of the first lens module 230, a parallel light ray Lp parallel to the optical axis D of the first lens module 230 will be generated after the light ray L passes through the first lens module 230. Then, the light ray Lp is again incident to the second lens module 240. Meanwhile, because the image module 250 is disposed on the optical axis E of the second lens module 240 and the second focal surface F2, the parallel light ray Lp passing through the first lens module 230 is converged by the second lens module 240 to form an illumination region R (not shown) falling on the image module 250. The light ray L reflected by the image module 250 passes through the lens 260, which projects an image onto a screen 270.

Furthermore, the light pipe 220 homogenizes the light ray L to form a rectangular plane light source on the exit 224, a point light source a1 in the rectangular plane light source is imaged onto a position b1 of the image module 250 through the first lens module 230 and the second lens module 240. A point light source a0 on the optical axis B of the light pipe 220 has the greatest brightness in the rectangular plane light source. The point light source a0 in the rectangular plane light source is imaged onto a position b0 on the image module 250 through the first lens module 230 and the second lens module 240. A point light source a2 in the rectangular plane light source is imaged onto a position b2 on the image module 250 through the first lens module 230 and the second lens module 240. Because the position b0 is the central position of the image module 250, the illumination region R can reach the predetermined imaging brightness and uniformity.

Figure 3A:
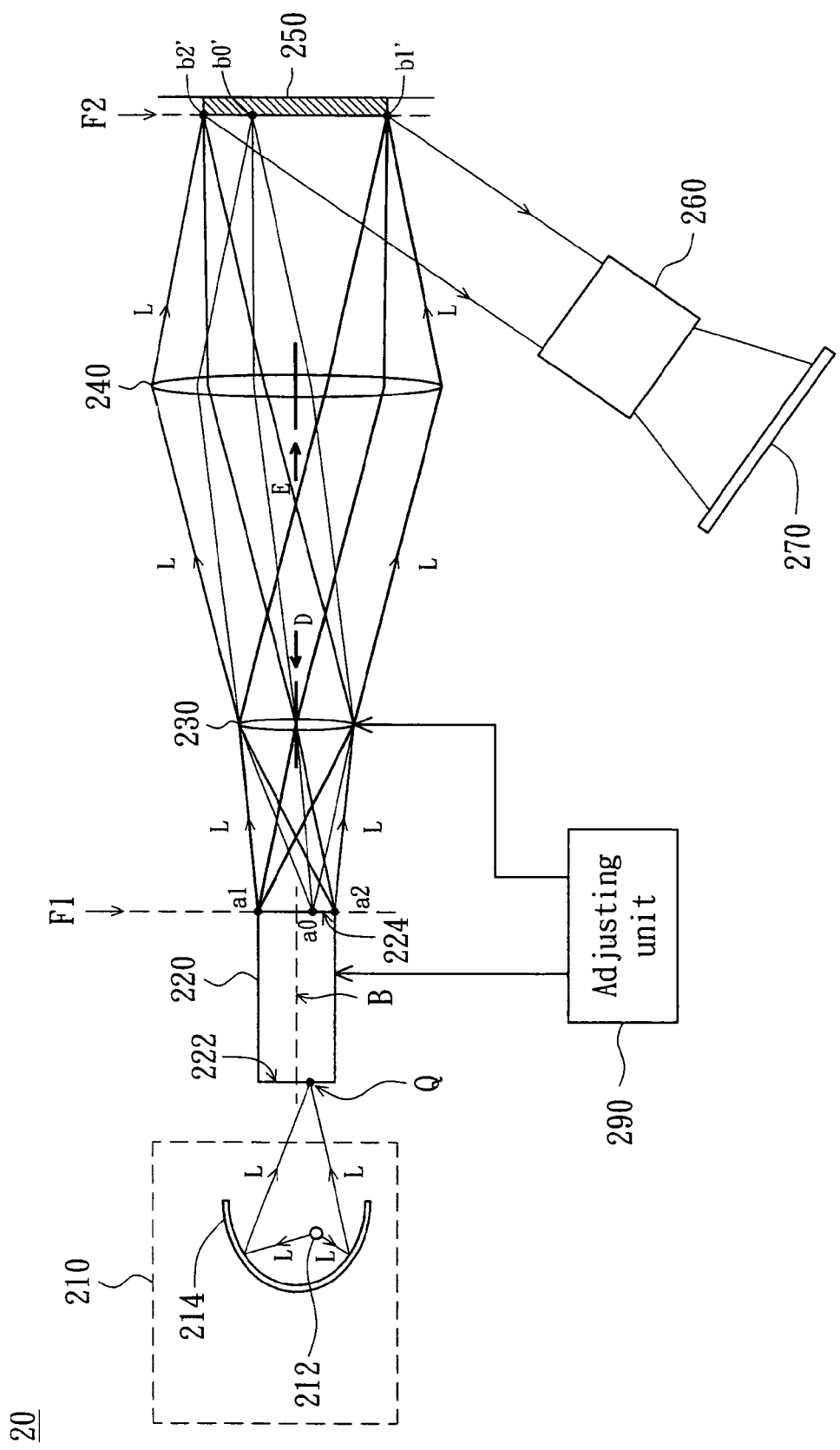
FIGS. 3A and 3B are schematic illustrations showing structures of the projector after a light bulb is shifted.
Figure 3B:
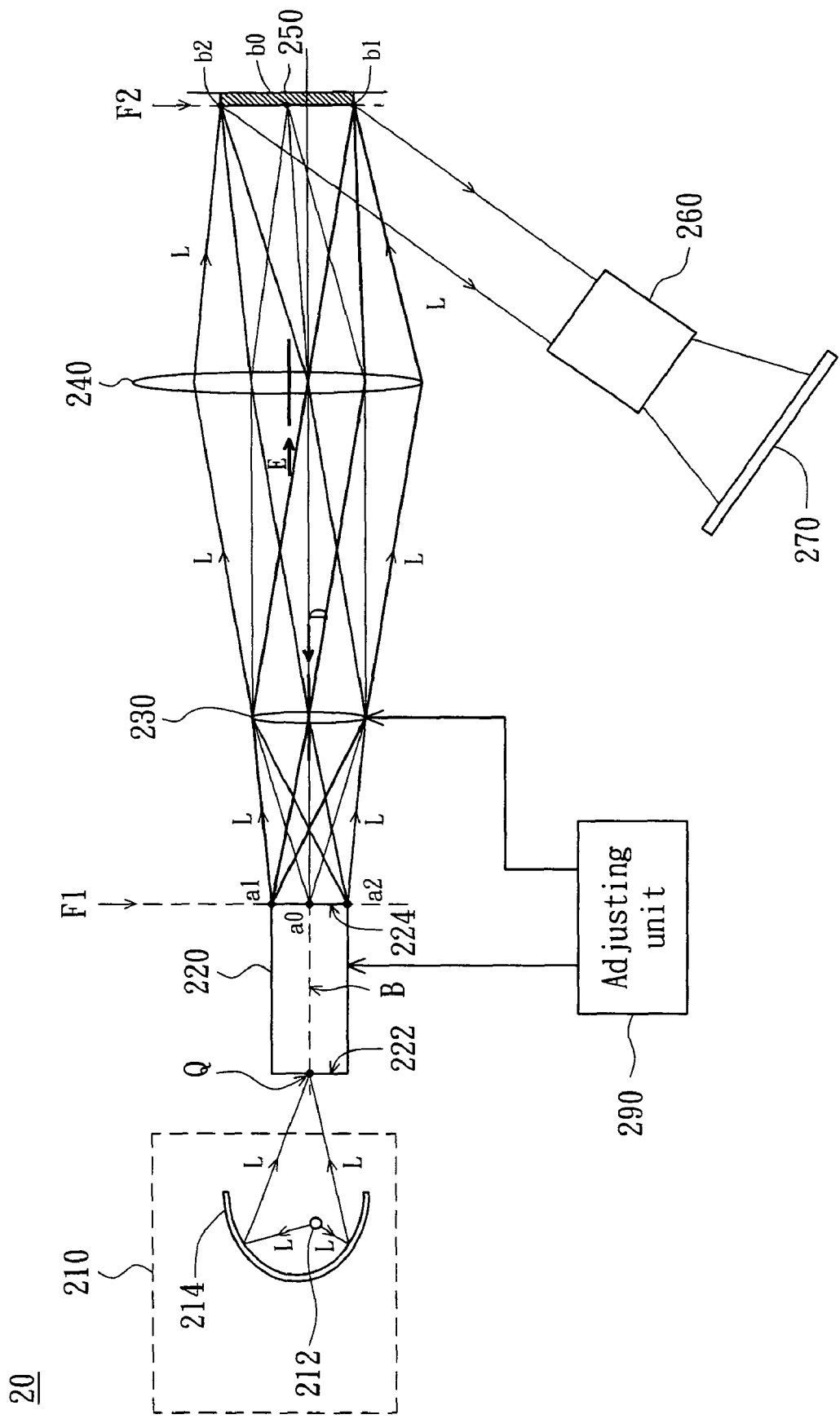

FIGS. 3A and 3B are schematic illustrations showing structures of the projector after a light bulb is shifted. As shown in FIGS. 3A and 3B, when the light bulb 212 is shifted from the predetermined position, the light converging spot Q is shifted from the optical axis B of the light pipe 220, the point light source a0 is shifted from the optical axis B of the light pipe 220, and the point light source a0 is transmitted to the position b0' on the image module 250 through the first lens module 230 and the second lens module 240. Because the position b0' is not the central position of the image module 250, as shown in FIG. 3A, the imaging brightness and uniformity of the projector 20 deteriorate correspondingly. In order to prevent the imaging brightness and uniformity from deteriorating, the adjusting unit 290 simultaneously moves the light pipe 220 and the first lens module 230 in a common-optical-axis manner so as to adjust the light converging spot Q back to the optical axis B of the light pipe 220. Also, the point light source a0 is also adjusted back to the optical axis B of the light pipe 220, and the point light source a0 is again imaged onto the position b0 of the image module 250, as shown in FIG. 3B. Thus, the predetermined imaging brightness and uniformity can be achieved.

More particularly, in order to prevent the position of the original illumination region R from deviating after the light pipe 220 and the first lens module 230 are moved, the projector 20 overlaps the exit 224 of the light pipe 220 and the first focal surface F1 of the first lens module 230 according to the confocal imaging principle, and the image module 250 is placed on the second focal surface F2 of the second lens module 240. The parallel light ray Lp, which is imaged at an infinite position, is generated after the light ray L passes through the first lens module 230, and then the second lens module 240 focuses the parallel light ray Lp onto the image module 250. Thus, when the light pipe 220 and the first lens module 230 are shifted, in the common-optical-axis manner, such that the light converging spot Q falls on the optical axis B of the light pipe 220, the light ray L passes through the first lens module 230 to still form the parallel light ray Lp parallel to the optical axis E of the second lens module 240. Finally, the second lens module 240 focuses the parallel light ray Lp onto the image module 250 to form the illumination region R without any displacement. That is, the illumination region R is still covered by the image module 250. According to the above-mentioned design, the projector 20 adjusts the light converging spot Q to fall on the optical axis B of the light pipe 220 without influencing the illumination region R of the image module 250 so as to achieve the predetermined imaging brightness and uniformity.

It is appreciated that the light pipe 220 and the first lens module 230 have to be moved simultaneously in the common-optical-axis manner so that the illumination region R on the image module 250 cannot be influenced. If only the light pipe 220 is moved and the first lens module 230 is not moved, the illumination region R of the image module 250 is shifted therewith, and the state of FIG. 3B cannot be recovered by way of adjusting.

Figure 4:
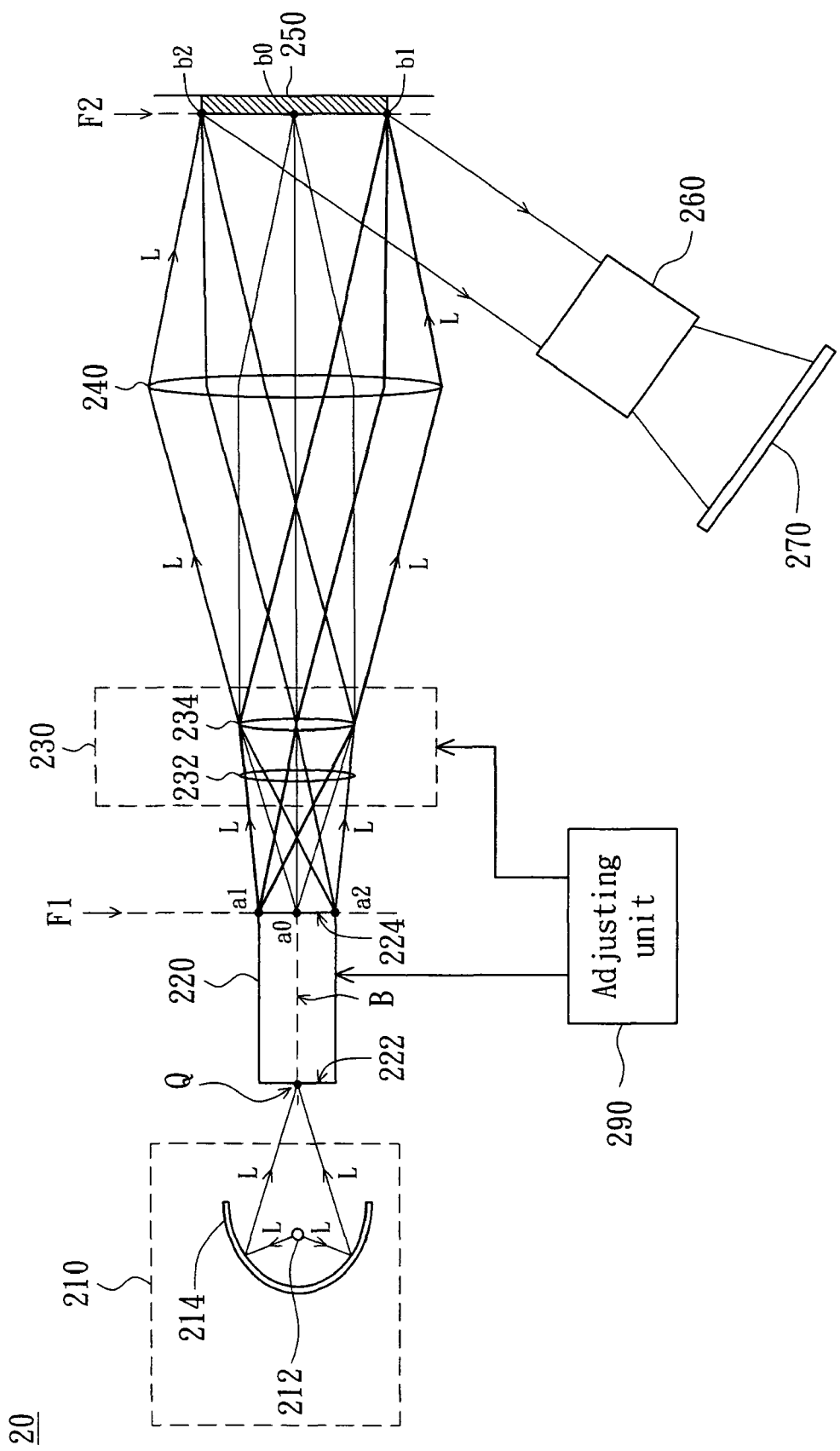
FIG. 4 is a schematic illustration showing a projector in which two lenses serve as a first lens module.

The first lens module 230 is not restricted to the use of a single lens, and multiple lenses can be used in the first lens module 230 according to the design requirement such that the image representation of the illumination region R becomes clearer. FIG. 4 is a schematic illustration showing a projector in which two lenses serve as a first lens module. For example, the first lens module 230 includes a lens 232 and a lens 234. The first focal surface F1 of the first lens module 230 is the effectively combined focal surface of the lens 232 and the lens 234. At this moment, the exit 224 of the light pipe 220 has to overlap the effectively combined focal surface of the lens 232 and the lens 234 so as to prevent the illumination region R from being shifted.

Figure 5:
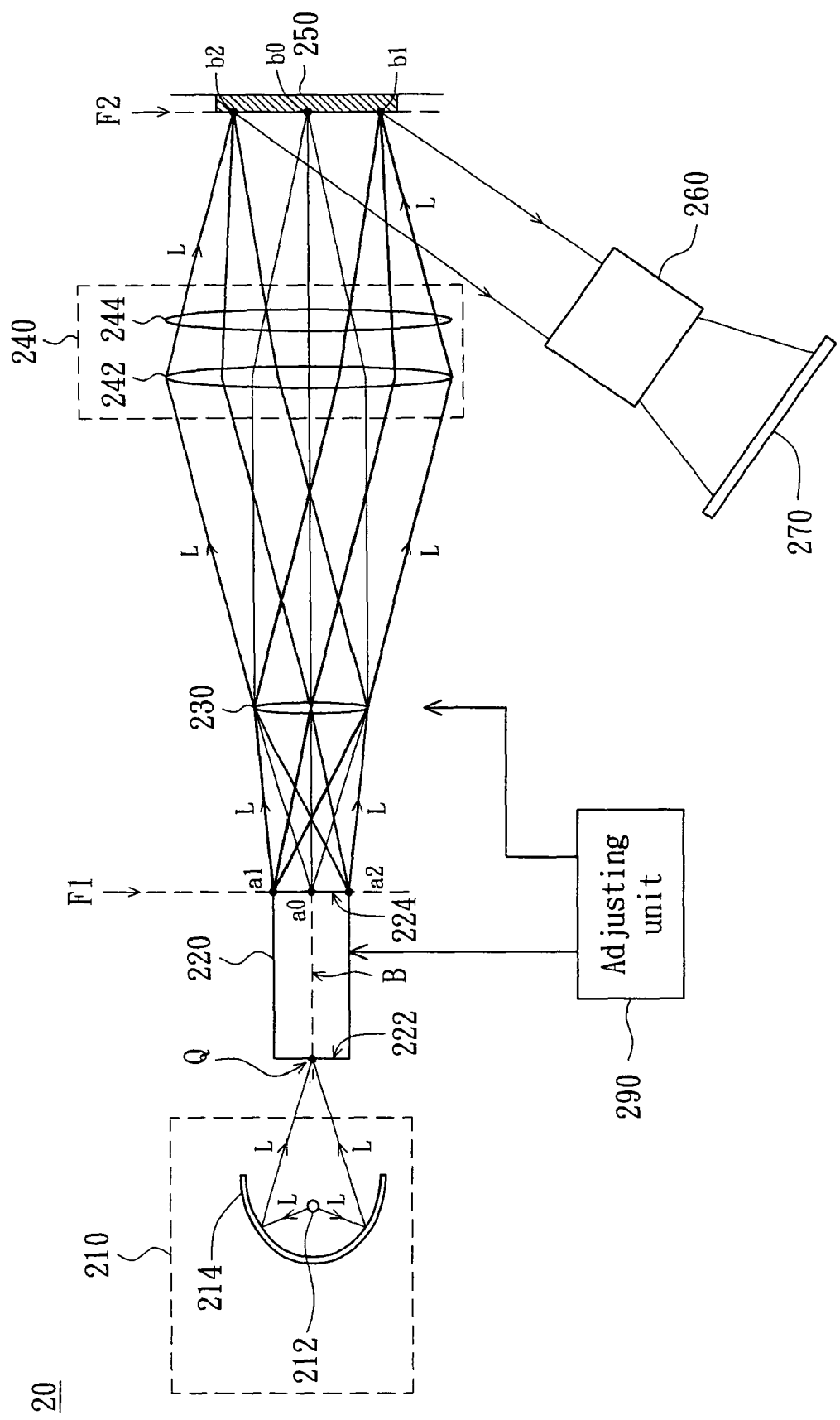
FIG. 5 is a schematic illustration showing a projector in which two lenses serve as a second lens module.

FIG. 5 is a schematic illustration showing a projector in which two lenses serve as a second lens module. Similarly, the second lens module 240 is also not restricted to the use of a single lens. Instead, multiple lens can be used in the second lens module 240 according to the design requirement such that the image representation of the illumination region R becomes clearer. For example, the second lens module 240 includes a lens 242 and a lens 244. The second focal surface F2 of the second lens module 240 is the effectively combined focal surface of the lens 242 and the lens 244. At this time, the image module 250 has to be displaced on the effectively combined focal surface of the lens 232 and the lens 234 to prevent the illumination region R from being shifted.

Regardless of the number of the lens or lenses, the object of enhancing the imaging brightness and uniformity by adjusting the light converging spot onto the optical axis B as long as the exit of the light pipe 220 is disposed on the first focal surface F1 of the first lens module 230 and the image module 250 is disposed on the second focal surface F2 of the second lens module 240. Thus, any modification may still be deemed as falling within the technological range of the invention.

In the projector capable of adjusting the brightness according to the embodiment of the invention, the exit overlaps the first focal surface, the image module is disposed on the second focal surface, and the light pipe and the first lens module are simultaneously moved in a common-optical-axis manner when the light converging spot deviates from the optical axis of the light pipe so as to adjust the light converging spot back to the optical axis of the light pipe. Thus, the predetermined imaging brightness and uniformity may be kept without influencing the illumination region of the image module.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A projector, comprising:
    a light module for generating a light ray;
    a light pipe having an entrance and an exit, wherein the light ray is converged onto the entrance and outputted through the exit;
    a first lens module for receiving the light ray through the exit, wherein the first lens module has a first focal surface overlapping the exit;
    a second lens module for receiving the light ray outputted through the first lens module, wherein the second lens module has a second focal surface;
    an image module for receiving the light ray outputted through the second lens module, wherein the image module is disposed on the second focal surface; and
    an adjusting unit for adjusting positions of the light pipe and the first lens module relative to the light module when a light converging spot of the entrance on which the light ray is converged deviates from an optical axis of the light pipe.

2. The projector according to claim 1, wherein the light ray is converged onto an optical axis of the light pipe, which overlaps an optical axis of the first lens module.

3. The projector according to claim 1, wherein the adjusting unit simultaneously moves the light pipe and the first lens module in a common-optical-axis manner such that the light converging spot falls on the optical axis of the light pipe.

4. The projector according to claim 1, wherein the image module is located on an optical axis of the second lens module.

5. The projector according to claim 1, wherein the first lens module comprises a first lens and a second lens, and the first focal surface is an effectively combined focal surface of the first lens and the second lens.

6. The projector according to claim 1, wherein the second lens module comprises a third lens and a fourth lens, and the second focal surface is an effectively combined focal surface of the third lens and the fourth lens.

7. The projector according to claim 1, wherein the image module is a digital micro-mirror device (DMD).

8. A projector, comprising:
    a light module;
    a first lens module having a first focal surface;
    a light pipe having an entrance and an exit, which is disposed between the light module and the first lens module, wherein the first focal surface overlapping the exit;
    a second lens module having a second focal surface;
    an image module, which is disposed on the second focal surface, wherein the second lens is disposed between the first lens module and the image module; and
    an adjusting unit, used for adjusting positions of the light pipe and the first lens module relative to the light module.

9. The projector according to claim 8, wherein an optical axis of the light pipe overlaps an optical axis of the first lens module.

10. The projector according to claim 8, wherein the image module is located on an optical axis of the second lens module.

11. The projector according to claim 8, wherein the first lens module comprises a first lens and a second lens, and the first focal surface is an effectively combined focal surface of the first lens and the second lens.

12. The projector according to claim 8, wherein the second lens module comprises a third lens and a fourth lens, and the second focal surface is an effectively combined focal surface of the third lens and the fourth lens.

13. The projector according to claim 8, wherein the image module is a digital micro-mirror device (DMD).

* * * * *

UNITED STATES PATENT AND TRADEMARK OFFICE
CERTIFICATE OF CORRECTION

| | | |
|---|---|---|
| PATENT NO. | : 7,815,318 B2 | Page 1 of 1 |
| APPLICATION NO. | : 11/657526 | |
| DATED | : October 19, 2010 | |
| INVENTOR(S) | : Chien-Chiang Hsu | |

It is certified that error appears in the above-identified patent and that said Letters Patent is hereby corrected as shown below:

Original Assignee shown: Qlada Corporation
    Correct Assignee should be: Qisda Corporation Signed and Sealed this
Twenty-ninth Day of March, 2011

David J. Kappos
*Director of the United States Patent and Trademark Office*